(12) United States Patent
Imgram et al.

(10) Patent No.: US 7,409,311 B2
(45) Date of Patent: Aug. 5, 2008

(54) METHOD FOR COOKING A COOKING LOAD INCLUDING COOKING ITEMS OF VARYING SIZE, AND COOKING DEVICE FOR CARRYING OUT SUCH A METHOD

(75) Inventors: Judith Imgram, Hanau (DE); Andrea Jürgens, Kircheim (DE); Katrin Lauterbach, Landsberg (DE); Jürgen Klasmeier, Landsberg (DE); Michael Greiner, Landsberg (DE); Roland Sterzel, Frankfurt (DE)

(73) Assignee: Rational AG, Landsberg/Lech (DE)

( * ) Notice: Subject to any disclaimer, the term of this patent is extended or adjusted under 35 U.S.C. 154(b) by 39 days.

(21) Appl. No.: 11/577,862

(22) PCT Filed: Oct. 25, 2005

(86) PCT No.: PCT/DE2005/001918

§ 371 (c)(1),
(2), (4) Date: Jul. 31, 2007

(87) PCT Pub. No.: WO2006/045290

PCT Pub. Date: May 4, 2006

(65) Prior Publication Data

US 2007/0288192 A1    Dec. 13, 2007

(30) Foreign Application Priority Data

Oct. 29, 2004    (DE) .................. 10 2004 052 660

(51) Int. Cl.
*A23L 3/01*    (2006.01)
(52) U.S. Cl. .................................... 702/132
(58) Field of Classification Search ................. 702/132
See application file for complete search history.

(56) References Cited

U.S. PATENT DOCUMENTS 4,036,995 A    7/1977    Koether et al. .............. 426/233

(Continued)

FOREIGN PATENT DOCUMENTS

DE    37 27 479 A1    6/1988

(Continued)

OTHER PUBLICATIONS

International Search Report for PCT/DE2005/001918, mailed Feb. 3, 2006.

(Continued)

*Primary Examiner*—Tung S Lau
(74) *Attorney, Agent, or Firm*—Marshall, Gerstein & Borun LLP

(57) ABSTRACT

A method for cooking a cooking load includes at least two particularly individual items for cooking, the cooking state of which is characterized by at least two cooking state parameters, including a first cooking state parameter and a second cooking state parameter, in a cooking chamber with application of at least one measuring device for recording values of at least one property of at least one cooking load, for determining at least one of said cooking state parameters, which alters depending on the cooking process, whereby at least two of the items for cooking in the cooking load, differ in size, total surface area, volume, weight and/or diameter, in particular, mean diameter.

28 Claims, 2 Drawing Sheets

U.S. PATENT DOCUMENTS

| | | | | |
|---|---|---|---|---|
| 4,701,588 | A | * | 10/1987 | Fukasawa .................. 219/668 |
| 6,299,921 | B1 | | 10/2001 | Löffer et al. ................ 426/233 |
| 6,555,791 | B2 | | 4/2003 | Lubrina et al. ............. 219/400 |
| 6,753,027 | B1 | | 6/2004 | Greiner et al. .............. 426/233 |
| 2006/0112833 | A1 | | 6/2006 | Blaschke .................... 99/325 |

FOREIGN PATENT DOCUMENTS

| | | |
|---|---|---|
| DE | 43 02 190 A1 | 7/1994 |
| DE | 299 23 215 U1 | 9/2000 |
| DE | 103 00 465 A1 | 7/2004 |
| EP | 1 022 972 B1 | 7/2002 |

OTHER PUBLICATIONS

Written Opinion of the International Searching Authority for PCT/DE2005/001918, mailed Feb. 3, 2006.

Examination Report for DE 102004052660, mailed May 18, 2005 (including translation).

* cited by examiner

METHOD FOR COOKING A COOKING LOAD INCLUDING COOKING ITEMS OF VARYING SIZE, AND COOKING DEVICE FOR CARRYING OUT SUCH A METHOD

BACKGROUND OF THE INVENTION

1. Field of the Invention

The invention concerns a method for cooking of a cooking load, containing at least two, especially lumpy, cooking items, the cooking state of which can be characterized in each case with at least two cooking state parameters, comprising a first cooking state parameter and a second cooking state parameter, in a cooking chamber using at least one measuring device for picking up data of at least one property of at least one cooking item, which determines at least one of the cooking state parameters, which changes as a result of the cooking process, whereby at least two of the cooking items of the cooking load differ in their size, in their total surface, in their volume, in their weight and/or in their diameter, especially in their mean diameter. Furthermore, the invention concerns a cooking device with a cooking chamber, with at least one measuring device, especially in the form of a core temperature probe for picking up a first and/or a second cooking state parameter of at least one cooking item, a heating device and a controller for automatic conduction of a cooking process, the controller receiving the output signal of the measuring device as input signal, according to which a process according to the invention is implemented.

2. Related Technology

In conventional cooking devices as is known for example from DE 229 23 215, in which a core temperature probe can be introduced into a cooking item, especially in the form of a piece of meat, as a rule the cooking process is completed when the core temperature of the piece of meat has reached a predetermined value (desired core temperature). Hereby it can be provided that different phases of the cooking process are initiated when the core temperature reaches a predetermined values during the cooking process. However, optimum cooking results with these cooking devices can mostly be achieved only when strictly delineated conditions are observed with regard to the nature, amount and size of the cooking item. For example, unsatisfactory results are obtained with such cooking devices when the individual pieces of meat differ in their size, that is, in their total surface, in their volume or in their diameter. Thus, for example, the value of the core temperature at which the browning or crusting phase is to be initiated depends greatly on the thickness of the pieces of meat to be cooked. In a purely time-based control of the cooking process with conventional cooking methods, therefore, sometimes one obtains pieces of meat with either too light or too heavy browning. The complexity of the cooking process for simultaneous cooking of a number of pieces of meat of different size in a cooking device is increased further by the fact that the time at which the browning or crusting phase is to be initiated usually also depends on the number of cooking items in the cooking chamber.

With the aid of additional input parameters, which are relevant for the time of the initiation of different preparation phases, for example the thickness or size of a piece of meat, a cooking process adjusted to the special properties of the individual cooking item could be achieved with the known equipment. However, this regularly requires additional measuring and/or weighing processes by the user before the startup of the cooking device and leads to a significant increase of the amount of data which must be stored and imagined in the computer unit of the cooking device in order to be able to make available the particular conditions for the optimum cooking process.

For example, a cooking process is known from EP 1 022 972 B1 in which, by using the time dependence of the measured quantities, which concern properties of a cooking item that change during the cooking process, one can take into consideration the amount and especially the thickness of the cooking item during the conduction of the cooking process, as long as we are dealing with an essentially homogeneous cooking load, that is, the cooking items do not differ significantly from one another in their size.

Especially in the case of cooking loads containing a large number of pieces of meat with highly different size, frequently unsatisfactory cooking results are obtained with the conventional cooking devices, both with regard to the internal degree of cooking, determined for example by the juiciness, as well as with regard to the external cooking degree, determined, for example, by the state of browning or crusting. While small pieces of meat generally have pronounced thick crusts with high degree of browning and are completely cooked, sometimes also overcooked and therefore dry, in the case of large pieces of meat, one obtains only a slightly browned external appearance and the inside is frequently not completely cooked. Since the user of cooking devices is almost constantly confronted with having to cook pieces of meat of different size, there is a need for improved cooking devices which no longer have the disadvantages of the state of the art.

GENERAL DESCRIPTION OF THE INVENTION

Therefore, the invention further develops the generic cooking process in such a way that the disadvantages of the state of the art are overcome, specifically so that an optimum cooking result is obtained for each piece of meat through the cooking process even during simultaneous cooking of, for example, pieces of meat of different size, especially with regard to the internal and external cooking degree.

Accordingly, the invention provides a cooking method with the following steps:

a) selecting at least one first cooking item in the cooking chamber which has a smaller size, a smaller total surface, a smaller volume, a smaller weight and/or a smaller diameter than at least one second cooking item in the cooking load, b) selecting desired values for at least the two cooking state parameters, including a first and second desired cooking state parameter for the first cooking item, c) conducting the cooking process in such a way that for the first cooking item at least the first and the second desired cooking state parameters are reached essentially simultaneously, whereby the actual values for at least one of the two cooking state parameters, including a first and/or second actual cooking state parameter, are followed, continuously or discontinuously, at least of the first cooking item, with the measuring device, d) removing the first cooking item from the cooking process upon or after reaching the first and second desired cooking state parameters at time point $t_1$, e) selecting at least one second cooking item, which has a larger size, a larger total surface, a larger volume, a larger weight and/or a larger diameter than the first cooking item, f) selecting desired values for at least the two cooking state parameters, including a first and second desired cooking state parameter for the second cooking item, g) determining the actual values for at least one of the two cooking state parameters, including a first and/or second actual cooking state parameter, at least of the second cooking item, h) determining the difference $D_{12}$ between the first actual cooking state parameter of the second cooking item and of the first desired cooking state parameter of the first cooking item, or the difference $D'_{12}$ between the second actual cooking state parameter of the second cooking item and the second desired cooking state parameter of the first cooking item, at the earliest at time $t_1$ and at the latest at a time $t_2$, where $t_2 > t_1$, and/or determining the difference $D_{22}$ between the second actual cooking state parameter and the second desired cooking state parameter or the difference $D'_{22}$ between the first actual cooking state parameter and the first desired cooking state parameter for the second cooking item, at the earliest at time $t_1$ and at the latest at time $t_2$, and i) continuing the cooking process as a function of $D_{12}$, $D'_{12}$, $D_{22}$ and/or $D'_{22}$ in such a way that at least the first desired cooking state parameter and the second desired cooking state parameter of the second cooking item are reached essentially simultaneously.

It is preferred that the course of the cooking process of the first and/or second cooking item be acquired using the measuring device by determining at least one of the actual values and/or at least a derivative with respect to time of at least one of the actual values.

Furthermore, it is preferred with the invention that by the following of the course of cooking, of at least the initial course of cooking, of the first and/or second cooking item, especially via a derivative with respect to time of at least one first, second and/or other cooking state parameter, the size, the total surface, the volume, the weight and/or the diameter of the first and/or second cooking item is determined and, depending on the determined size, on the determined total surface, on the determined volume, on the determined weight and/or on the determined diameter of at least the first, second and/or other desired cooking state parameter is selected for the first and/or second cooking item.

The first and/or second desired cooking state parameter of the second cooking item can be derived from the first and/or second desired cooking state parameter of the first cooking item.

Furthermore, it is preferred with the invention that the first cooking item is the cooking item of the cooking load with the smallest size, the smallest total surface, the smallest volume and/or the smallest weight, and/or the second cooking item is the cooking item of the cooking load with the next largest size, the next largest total surface, the next largest volume and/or the next largest weight in comparison to the first cooking item.

According to the invention it is also preferred that the first cooking state parameter selected be a quantity that determines the internal degree of cooking, including the core temperature, the juiciness and/or the texture and/or a cooking environment parameter, including the cooking chamber temperature and/or humidity, and/or that as the second cooking state parameter a quantity is selected that determines the external degree of cooking, including the degree of browning, a surface temperature, an edge zone temperature and/or a crust formation and/or a quantity determining the quality of the cooking item, including the P-value (pasteurization value), the F-value (sterilization value), the pH value, the odor, the degree of ripeness and or the thermal conductivity.

Hereby it can be provided that a C-value, especially selected from the degree of browning, the P-value or the F-value is determined as follows:

$$C^{UF}_{BT} = \int_{ST}^{t_{Ende}} UF^{\frac{[Temp(t)-DT]}{10}} dt$$

where
ST is the time at which the start temperature is reached,
$t_{End}$ is the time at which the desired P-value is reached,
Temp(t) is the temperature as a function of time,
UF is a material constant of the cooking item, and
BT is the reference temperature.

In step i), preferably $D_{12}$ and/or $D_{22}$ are used.

In one embodiment of the invention during the cooking process at least one value of a setting point of the cooking device that influences the cooking process is established as a function of at least one derivative with respect to time of at least one cooking state parameter.

Furthermore, the amount of energy that is to be introduced into the cooking chamber to reach the first and second desired cooking state parameters of the second cooking item can be established as a function of the amount of energy which was shown to be necessary to reach the first and second desired cooking state parameters for the first cooking product.

After reaching the first and second desired cooking state parameters for the first cooking item, the second actual cooking state parameter of the second cooking item is determined and the subsequent cooking process for the second cooking item, in order to achieve simultaneously, the first and second desired cooking state parameters of the second cooking item is guided as a function of the size, the total surface, the volume and/or of the diameter, especially of its temperature course, as well as of the difference between the first desired cooking state parameter of the first cooking item and the first actual cooking state parameter of the second cooking item, whereby especially the core temperature is selected as the first cooking state parameter, and the degree of browning is selected as the second cooking state parameter.

Embodiments of the invention can be characterized by the fact that, as the measuring device, a cooking process probe, especially a core temperature probe, is selected, which is inserted at the beginning of the cooking process, preferably at step a), into the first cooking item, and is inserted into the second cooking, item at the earliest at time $t_1$ and at the latest at time $t_2$, preferably in step h).

It is also proposed with the invention that steps a) to i) be repeated until all cooking, items of the cooking load, in the order of size, total surface area, volume, weight and/or diameter, are completely cooked.

Furthermore, it can also be provided that as first, second and/or other cooking items, cutlets, beef shoulder, sucking pig, chops, ham, poultry, for example, chicken, pork knuckles, roasts, vegetables and/or parts thereof, can be selected.

The invention further develops the generic cooking device so that the disadvantages of the state of the art are overcome.

Accordingly, the control device is equipped to control the cooking process according to the invention.

Hereby a device can be provided for entering and for storing parameter values regarding the cooking item and/or the cooking process, whereby the control device uses one or several of these parameter values as input parameters for controlling the cooking process Finally, according to one embodiment of the invention it is proposed that each desired cooking state parameter to be achieved at the end of the cooking process can be entered.

With the method according to the invention an extremely satisfactory cooking result is obtained for each individual cooking item, in cooking loads that include cooking items with a number of different volumes, weights, diameters and/or surface areas, as well as for those cooking loads which consist essentially only of cooking items with two different volumes, weights, diameters and/or surface classes. In the case of cooking items which differ with regard to their volume, their weight, their diameter and/or their surface, we generally say that these cooking items have a different size. Consequently, in the sense of the invention, the concepts of volume, diameter, weight or surface have the same meaning as size. In the case of surface, weight, volume and diameter we are dealing with values that can be determined for an individual cooking item. A first cooking item is understood to mean, in the context of the present invention, an item which has a smaller size, that is, a smaller surface, a smaller weight, a smaller volume and/or a smaller diameter than another second cooking item of the cooking load to be cooked. Desired cooking state parameters are usually parameters which are realized in the desired end product. Especially preferably the first cooking item parameter is an internal cooking item parameter, for example the core temperature and the second cooking item parameter is an external cooking item parameter, for example the degree of browning.

According to the invention, use is made of the fact that, for example, in a controller of a cooking device, which is in direct or indirect connection with a measuring device, cooking processes for standardized cooking item sizes can be deposited. For example, in the case of a predetermined, known initial cooking process for a cooking item to be investigated with a measuring device, a specific time change of a first, second or other cooking item parameter are determined, then, by comparison with the deposited standard values, one can immediately conclude the size or the surface, the volume, the weight or the diameter of the cooking item. In this way, a time-consuming complicated measurement of the cooking item can be avoided in an elegant manner. As a rule, even 0.5 minute-2 minutes at the beginning of a cooking cycle are sufficient in order to be able to derive the size of the investigated cooking item by the change of the detected actual cooking state parameters as a function of time. In the case of large cooking items, for example pig haxes, ham, roast, sucking pig or a beef shoulder, the time of evaluation can be about 15 minutes in order to determine the size.

Hereby, according to the invention it is also provided that by following, especially during the initial part of the cooking, the first and/or second cooking item with at least one measuring device, especially by differentiating at least a first, second or other cooking item parameter with respect to time, the total surface, the volume, the weight and/or the cooking product are determined and, depending on the determined total surface, volume, weight and/or diameter, at least one first and/or second desired cooking item parameter is selected for the first and/or second cooking item. The first and second cooking item parameters can be determined both using one uniform measuring device as well as using separate measuring devices.

In a further development of the method according to the invention, it is provided that the first and or second actual cooking item parameter of the second cooking item is derived from the first and/or second desired cooking item parameter of the first cooking item. For example, once the desired degree of browning of the first cooking item is reached, the degree of browning of the second cooking item can be determined with consideration of the available cooking item parameters and cooking parameters, without having to determine this degree of browning explicitly, for example by spectroscopy. In this case it is, for example, sufficient if scaled standard comparison values for the cooking processes coming into consideration are deposited in the control unit. From the knowledge of the size of the first cooking item, of the cooking process for reaching the first and second desired cooking item parameters of the first cooking item, as well as the of the values for the first and/or second desired cooking item parameters of the first cooking item, the first and/or second actual cooking item parameters of the second cooking item can be derived simply.

In another embodiment, it is provided that the first cooking item represents that cooking item of the cooking load which has the smallest total surface, the smallest volume, the smallest diameter and/or the smallest weight. It was found to be expedient to use the cooking process according to the invention in such a way that the cooking item with the smallest size within the cooking load be selected as the first cooking item. Most preferably the second cooking item is then the one with the next largest size, that is, with the next largest volume, diameter, weight and/or the next largest surface. As soon as the first cooking item has reached the desired cooking item parameter, it is removed from the cooking process, preferably from the cooking chamber. After this has been done, the previously second cooking item will itself represent a first cooking item, for which the cooking process is to be conducted in such a way that the first and second cooking item parameters of this cooking item reach essentially the particular desired values at the same time. The cooking product with a larger, especially with the next larger size is then to be designated as the second cooking item in the sense of the invention. This process is preferably continued until one reaches the largest size in the cooking load and the first and second desired cooking item parameters are essentially reached simultaneously for this one too.

Preferably, the first cooking item parameter is the core temperature of a cooking item. The second cooking item parameter is preferably the P-value, the F-value, the C-value and/or the degree of browning of the cooking item.

The P-value provides significantly more exact information about the state of cooking of a cooking item than, for example, the cooking temperature. For example, when potatoes are cooked, in the case of pressure steam cooking a temperature of, for example, 120° C. is available, while with of normal steam cooking the same cooking result can be achieved at a temperature of about 98° C. Hereby, however, the time periods which are necessary for achieving the desired cooking results differ considerably. The P-value represents a pasteurization value, above which the degree of pasteurization of a cooking item, that is, absence of germs, can be shown.

Consequently, a smaller P-value stands, for example, for the final cooking state al dente while a higher P-value would represent a completely cooked cooking item.

The recalculation factor UF, which is to be used for the determination of the P-value, is a specific cooking item parameter, which can be determined, for example, with the aid of standardized cooking experiments at different temperatures by the fact that the cooking time characteristics for the particular temperatures can be related to one another. This recalculation factor should be essentially constant within a cooking item class or for a certain cooking item type. The reference temperature BT generally represents the particular temperature at which the cooking of the cooking item is usually performed.

The F-value can also be used to obtain information about the cooking state. Especially in the calculation of the P- and F-values, instead of the cooking temperature Temp(t) which changes as a function of time, the actual core temperature can be used as variable quantity.

Fundamentally, the equations mentioned above are suitable for the determination of the P-value as well as of the F-value for the description of chemical reactions of the $1^{st}$ order. For example, if the browning of a cooking item behaves approximately as a first order reaction, the above equations can be used for the determination or incorporation of the degree of browning in determining the optimum cooking course.

Chemical reactions of the $1^{st}$ order or their effects in the food area can be found described, for example, in H. G. Kessler, "Lebensmittel und Bioverfahrenstechnik—Molkerei Technologie" [Food and Bioprocessing Technology—Dairy Technology], TU Munich, Weihenstephan, Verlag A. Kessler, ISBN 3 9802378-4-2, especially on pages 27 to 48 and 127 to 178.

It is especially advantageous to provide a memory unit in which an assignment of values is maintained of at least one of the derivatives with respect to time of a cooking state parameter as desired values of setting points of the cooking equipment, and to which the control device has access in the determination of the desired values for these setting points. In addition to the derivative, other assigned parameters, for example the actual value of the cooking item parameter or the time since the beginning of the cooking process may be provided. Hereby, the desired values in the memory device are specifically stored as numerical data and can be recalled by entering the address data, which include a value for the first derivative of a cooking state parameter, so that the input of the value of this derivative and possibly other address data which could concern, for example, the actual value of the cooking item parameter or the type of cooking item, results in access to the corresponding stored desired value.

Furthermore, the cooking device according to the invention can be equipped to influence the setting of points manually as well as having a device for storing the values predetermined by an operator or by the controller, together with the corresponding measured value of a cooking item parameter and/or one or several of their derivatives with respect to time, in such a way that the controller, based on the data of earlier stored cooking processes as well as of measured values recorded in a cooking process by one or several measuring devices, can produce the sequence of values of the setting points of the previous process. Hereby, especially during storage, an assignment of values of the derivative of a cooking item parameter to desired values of a setting point of the cooking device can be produced, as described before.

BRIEF DESCRIPTION OF THE DRAWINGS

Now, with the method according to the invention, it becomes possible to optimally cook cooking loads consisting of a number of individual cooking items having different sizes, that is, to obtain an optimum cooking result for each individual cooking item in a single continuous cooking process. Hereby, upon reaching the desired cooking result for a cooking item of a certain size, the cooking process can be continued by replacing the measuring device into a larger, especially into the next larger, size, for example, by placing the cooking process probe, especially the core temperature probe, from a first into a second cooking item. Thus, for example, based on the increase of the core temperature per time at a defined cooking chamber temperature and fan speed, that is, at a defined energy transfer, the size of the food to be measured can be recognized. As soon as the size of the cooking item has been determined, the cooking process can be adjusted correspondingly to this size in order to obtain the desired cooking result, expressed, for example, in the form of the first and second desired cooking state parameters. For example, in the case of a larger cooking item, the browning phase usually takes longer and therefore it is recommended that this phase be performed at lower temperatures than in the case of a smaller cooking item which has to receive the same final browning.

DETAILED DESCRIPTION OF THE DRAWINGS

Other characteristics and advantages of the invention follow from the description given below, in which an embodiment of the method according to the invention is explained as an example with the aid of two drawings. Hereby FIG. 1 shows a core temperature/time diagram for a cooking process according to the state of the art, not true to scale, FIG. 2 shows a core temperature/time diagram for a cooking process according to the invention, not true to scale, FIG. 3 shows another core temperature/time diagram for a cooking process according to the invention, not true to scale; and FIG. 4 shows a browning/time diagram for a cooking process according to the invention, not true to scale.

Figure 1:
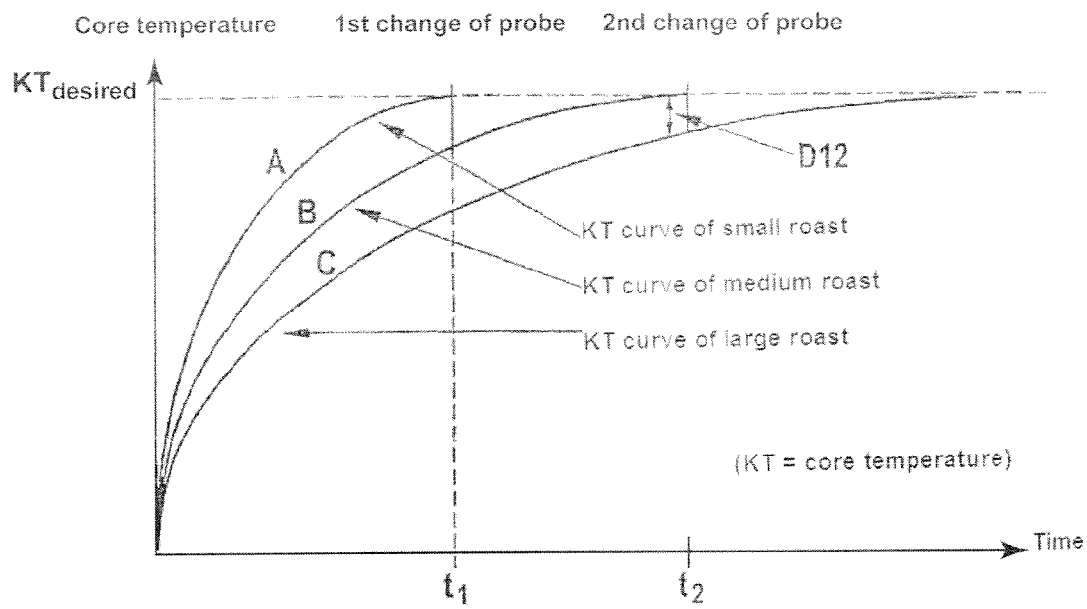

FIG. 1 shows three graphs, A, B and C, which show the course of the actual core temperature until the desired core temperature $KT_{desired}$ is reached, for a small, medium and large cooking item. Hereby, the cooking process is adjusted so that the small cooking item (Graph A) reaches at time $t_1$ its desired core temperature and at the same time also the desired degree of browning, that is, a second desired cooking state parameter. If then, that is at time $t_1$, a core temperature probe which is not shown, that which was first controlling the core temperature of the first, small cooking item, is inserted now into the second, medium cooking item, and the cooking process is continued with the core temperature controlled, for example, at an essentially unchanged cooking chamber temperature, thus one reaches the desired core temperature for the medium cooking item (Graph B) at time $t_2$. However, when proceeding in this way, it is not guaranteed that the second desired cooking state parameter, the desired degree of browning of the medium cooking product, is also reached. After the desired core temperature has been reached for the medium cooking item, that is, at time $t_2$, in the conventional cooking process, after replacing the core temperature probe into the large cooking item, the cooking process is core temperature controlled again until the desired core temperature for the large cooking item is reached (Graph C) accepting the same disadvantages as outlined above for the medium cooking item. With regard to the large cooking item, in the sense of the present application, the medium cooking item represents the first cooking item while the large cooking item is to be designated as the second cooking item. If the cooking is always carried out only by controlling the core temperature, frequently the desired degree of browning is not reached.

Figure 2:
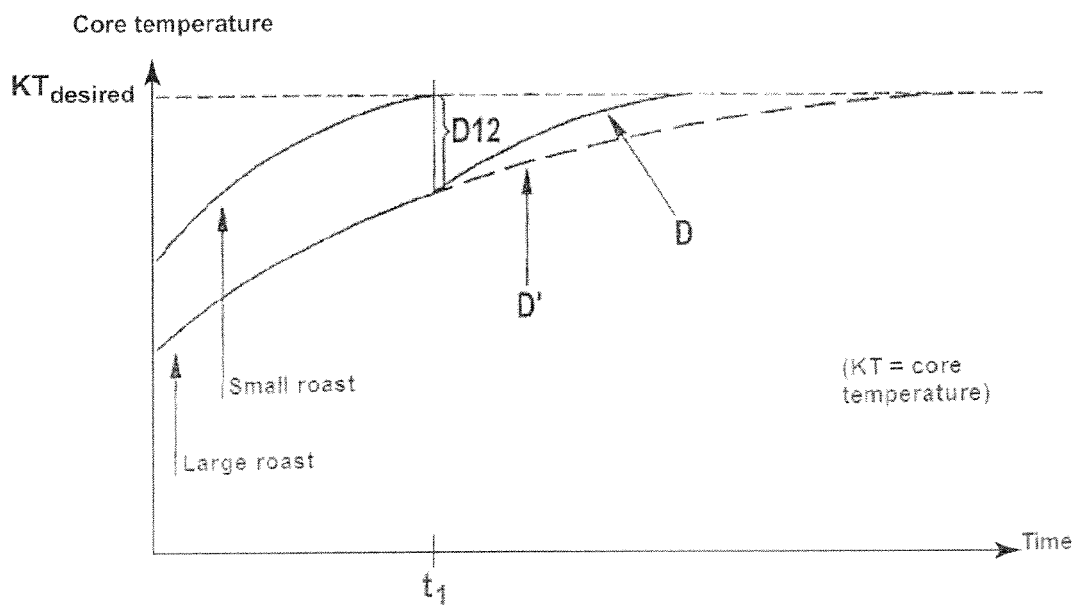

As can be seen from FIG. 2, in a cooking process according to the invention, after the desired core temperature for a first smaller cooking item has been reached, the cooking process is continued for the second larger cooking item no longer only by controlling the core temperature, but also a new adjustment or adaptation of the cooking process takes place, so that when the desired core temperature for the largest cooking product is reached, the optimum degree of browning is reached at the same time. The adjustment of the cooking process to reach this goal is carried out based on the difference $D_{12}$ between the desired core temperature of the smaller cooking item and the actual core temperature of the larger cooking item at time $t_1$, that is, when the desired core temperature for the smaller cooking item is reached, and thus when the core temperature probe is replaced, that is, on the basis of the difference $D'_{22}$ between the actual and desired core temperature of the larger cooking item, with consideration of the size of the larger cooking item. Accordingly, the cooking chamber temperature, based on the newly calculated optimum core temperature course according to Curve D is adjusted until reaching the desired core temperature for the larger cooking item. The course of the actual core temperature of the larger cooking item using a conventional cooking process guided only by core temperature is indicated with the dotted line D'.

Figure 3:
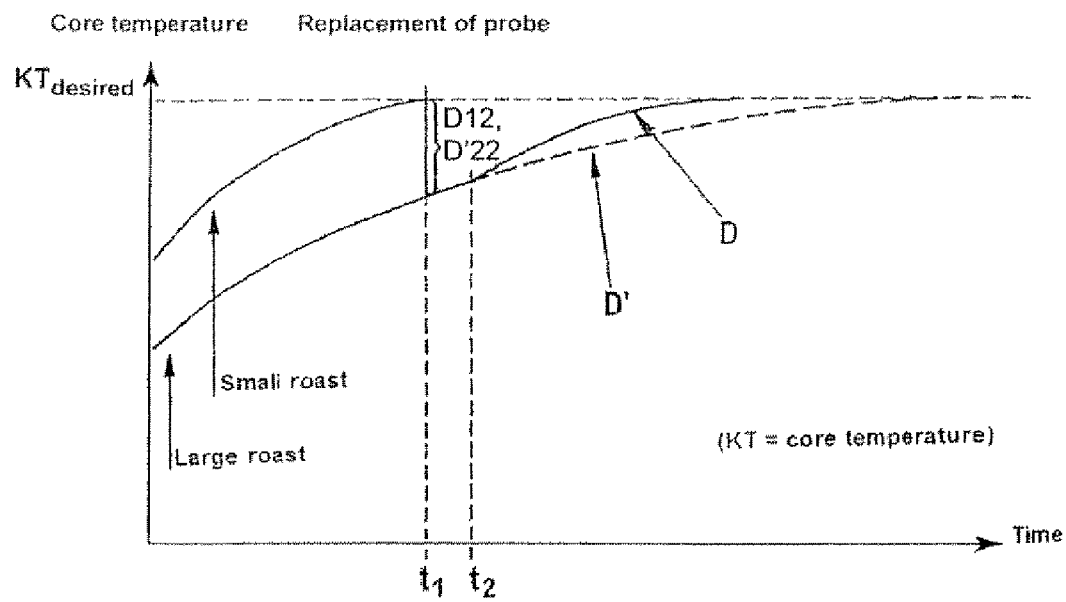
Figure 4:
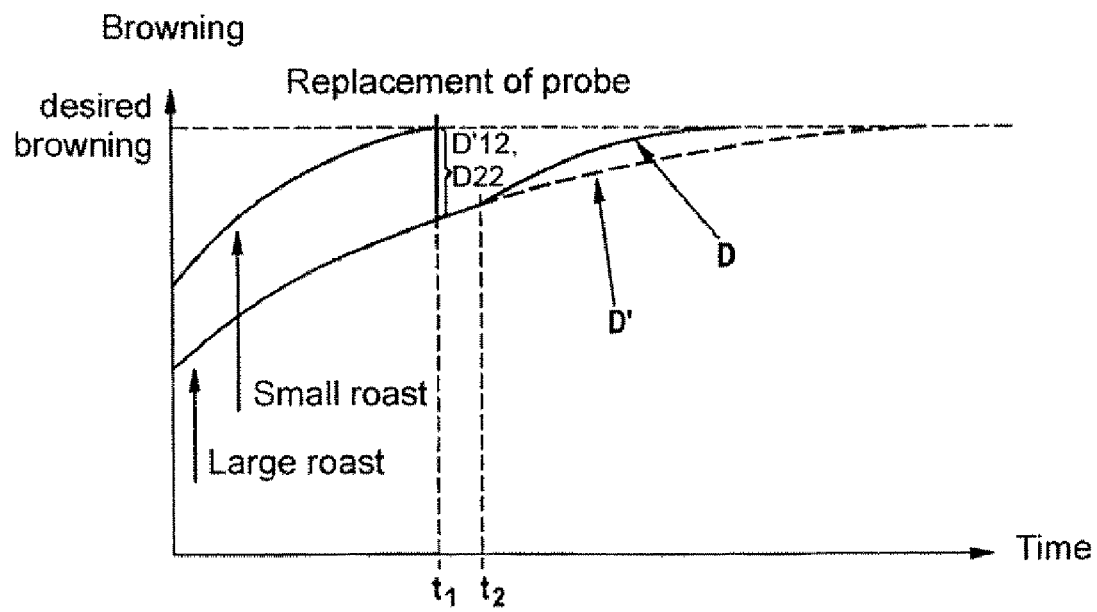

FIG. 3 shows the curve of the core temperature of a smaller as well as of a larger cooking item over time, similarly to FIG. 2, but with the difference that, after moving the core temperature probe or after reaching the desired core temperature at time $t_1$ for the smaller cooking item, the cooking process is continued after time $t_1$ for a certain time period, namely $t_2$-$t_1$, that is, up to the time point $t_2$, in the usual way. This time span is utilized in order to be able to draw conclusions about the size of the larger cooking item from the change of the actual core temperature as a function of time. As soon as the size has been evaluated or determined in this way, the cooking process is continued in the manner as described for the process according to FIG. 2; that is, the cooking chamber temperature is changed in such a way that the core temperature, as the first cooking item parameter and a second cooking item parameter, for example, the degree of browning, reach their desired values at the same time, also for the larger cooking item.

FIG. 4 shows a graph of the second cooking item parameter across time, for example, the degree of browning of the first and second cooking items across time. Additionally, FIG. 4 schematically shows the difference $D'_{12}$, $D_{22}$ between the second actual cooking state parameter of the first and second cooking items, respectively, and the second desired cooking state parameter of the first cooking item. A cooking process performed according to the curve depicted in FIG. 4 is similar to the process described above with reference to FIG. 3, but based on the second cooking state parameter, e.g., browning, instead of the first cooking state parameter, e.g., core temperature. Therefore the details will not be repeated.

The characteristics of the invention disclosed in the above specification, in the claims and in the drawings can be essential both individually as well as in any arbitrary combination for the realization of the invention in its different embodiments.

The invention claimed is:

1. Method for cooking a cooking load containing at least two cooking items, wherein the cooking state of the cooking items can be characterized in each case by at least two cooking state parameters, comprising a first cooking state parameter and a second cooking state parameter, in a cooking chamber using at least one measuring device for picking up data of at least one property of at least one cooking item, the property determines at least one cooking state parameter, the parameter changes as a result of the cooking process, whereby at least two of the cooking items of the cooking load differ from each other in at least one of their size, their total surface area, their volume, their weight and their diameter, the method comprising the following steps:
    a) selecting at least one cooking item in the cooking chamber which has at least one of a smaller size, a smaller total surface area, a smaller volume, a smaller weight and a smaller diameter than at least one second cooking item in the cooking load,
    b) selecting desired values for at least the two cooking state parameters, including first and second desired cooking state parameters for the first cooking item,
    c) conducting the cooking process in such a way that for the first cooking item at least the first and the second desired cooking state parameters are reached substantially simultaneously, whereby the actual values for at least one of the two cooking state parameters, including at least one of a first and second actual cooking state parameter, are followed continuously or discontinuously, at least of the first cooking item, with the measuring device,
    d) removing the first cooking item from the cooking process upon or after reaching the first and second desired cooking state parameters at a time point $t_1$,
    e) selecting at least one second cooking item, which has at least one of a larger size, a larger total surface area, a larger volume, a larger weight and a larger diameter than the first cooking item,
    f) selecting desired values for at least the two cooking state parameters, including a first and second desired cooking state parameter for the second cooking item,
    g) determining the actual values for at least one of the two cooking state parameters, including at least one of a first and second actual cooking state parameters, at least of the second cooking item,
    h) determining at least one of difference $D_{12}$ between the first actual cooking state parameter of the second cooking item and the first desired cooking state parameter of the first cooking item, a difference $D'_{12}$ between the second actual cooking state parameter of the second cooking item and the second desired cooking state parameter of the first cooking item, at the earliest, at time $t_1$, and at the latest, at a time $t_2$, where $t_2 > t_1$, and a difference $D_{22}$ between the second actual cooking state parameter and the second desired cooking state parameter or the difference $D'_{22}$ between the first actual cooking state parameter and the first desired cooking state parameter for the second cooking item, at the earliest, at time $t_1$, and at the latest, at time $t_2$, and
    i) continuing the cooking process as a function of at least one of $D_{12}$, $D'_{12}$, $D_{22}$ and $D'_{22}$ in such a way that at least the first desired cooking state parameter and the second desired cooking state parameter of the second cooking item are reached substantially simultaneously.

2. Method according to claim 1, comprising acquiring the course of the cooking process of at least one of the first and second cooking items with the measuring device by determining one of at least one of the actual values and at least one derivative with respect to time of at least one of the actual values.

3. Method according to claim 1, comprising deriving at least one of the first and second desired cooking state parameters of the second cooking item from at least one of the first and second desired cooking state parameters of the first cooking item.

4. Method according to claim 1, wherein the first cooking item is the cooking item of the cooking load with at least one of the smallest size, the smallest total surface, the smallest volume and the smallest weight, and the second cooking item is the cooking item of the cooking load with at least one of the next largest size, the next largest total surface, the next largest volume and the next largest weight in comparison to the first cooking item.

5. Method according to claim 1, comprising selecting at least one of a parameter determining the internal degree of cooking, including at least one of the core temperature, the juiciness, the texture, and a cooking environmental quantity, including at least one of the cooking chamber temperature and humidity, as the first cooking state parameter; and selecting as a second cooking state parameter a quantity which determines the external degree of cooking, including at least one of the degree of browning, a surface temperature, an edge zone temperature, crust formation, and a quantity determining the cooking item quality, including at least one of the P-value (pasteurization value), the F-value (sterilization value), the pH value, the odor, the degree of ripeness and the thermal conductivity.

6. Method according to claim 1, comprising using at least one of $D_{12}$ and $D_{22}$ in step i).

7. Method according to claim 1, comprising during the cooking process establishing at least one value of a setting point of the cooking device that influences the cooking process as a function of at least one derivative with respect to time of at least one cooking state parameter.

8. Method according to claim 1, comprising determining the amount of energy which is to be introduced into the cooking chamber in order to reach the first and second desired cooking state parameters of the second cooking item as a function of the amount of energy which was shown to be required in order to reach the first and second desired cooking state parameters for the first cooking item.

9. Method according to claim 1, comprising after reaching the first and second desired cooking state parameters for the first cooking item, determining the second actual cooking state parameter of the second cooking item, and guiding the subsequent cooking process for the second cooking item, in order to achieve simultaneously the first and second desired cooking state parameters of the second cooking item, as a function of at least one of the size, the total surface area, the volume and the diameter course as well as of the difference between the first desired cooking state parameter of the first cooking item and of the first actual cooking state parameter of the second cooking item.

10. Method according to claim 1, wherein the measuring device is a cooking process probe, insert at the beginning of the cooking process, into the first cooking item and is inserted into the second cooking item at the earliest, at time $t_1$, and at the latest, at time $t_2$.

11. Method according to claim 1, comprising repeating steps a) to i) until all cooking items of the cooking load, in the order of at least one of the size, total surface, volume, weight and diameter are completely cooked.

12. Method according to claim 1, wherein at least one of the first, the second, and other cooking items are selected from the group consisting of cutlets, beef shoulder, sucking pig, chops, ham, poultry, pork knuckles, roast, vegetables and parts thereof.

13. Cooking device comprising a cooking chamber, at least one measuring device for picking up at least one of a first and second cooking state parameter of at least one cooking item, a heating device and a controller for automatic control of a cooking process, said controller receiving an output signal of the measuring device as an input signal, wherein the controller is equipped to guiding the cooking process according to a method according to claim 1.

14. Method according to claim 1, wherein the cooking load contains at least two lumpy cooking items.

15. Method according to claim 1, wherein the cooking load contains at least two cooking items, whereby at least two of the cooking items differ from each other in mean diameter.

16. Method according to claim 2, comprising following of the course of cooking, especially the course of cooking of at least one of the first and second cooking items, determining at least one of the size, the total surface area, the volume, the weight and the diameter of at least one of the first and second cooking items and, depending on at least one of the determined size, the determined total surface area, the determined volume, the determined weight, and the determined diameter, selecting at least one of the first, second and other desired cooking state parameter for at least one of the first and second cooking items.

17. Method according to claim 4 comprising determining a C-value, as follows:

$$C_{BT}^{UF} = \int_{ST}^{t_{Ende}} UF^{\frac{[Temp(t)-DT]}{10}} dt$$

where
ST is the time at which the start temperature is reached,
$t_{End}$ is the time at which the desired C-value is reached,
Temp(t) is the temperature as a function of time,
UF is a material constant of the cooking item, and
BT is the reference temperature.

18. Method according to claim 9, comprising guiding the cooking process for the second cooking item as a function of its temperature course.

19. Method according to claim 9, comprising selecting the core temperature as the first cooking state parameter and selecting the degree of browning as the second cooking state parameter.

20. Method according to claim 10, wherein the measuring device is a core temperature probe.

21. Method according to claim 10, comprising inserting the cooking process probe into the first cooking item in step a) according to claim 1.

22. Method according to claim 10, comprising inserting the cooking process probe into the second cooking item in step h) according to claim 1.

23. Cooking device according to claim 13, comprising a deice for entering and storing parameter values regarding at least one of the cooking item and the cooking process, whereby the controller uses one or several of these parameter values as input quantities for guiding the cooking process.

24. Cooking device according to claim 13 comprising at least one measuring device in the form of a core temperature probe.

25. Method according to claim 16, comprising following the initial course of cooking.

26. Method according to claim 16, comprising following the course of cooking through a derivative with respect to time of at least one of the first, second and other cooking state parameters.

27. Method according to claim 17, comprising determining a C-value selected from at least one of the degree of browning, the P-value, and the F-value.

28. Cooking device according to claim 23, wherein each desired cooking state parameter to be reached at the end of the cooking process can be entered into the device.

* * * * *